United States Patent [19]

Friedman et al.

[11] Patent Number: 4,690,755
[45] Date of Patent: Sep. 1, 1987

[54] ANAEROBIC CONTACTOR

[75] Inventors: Alexander A. Friedman, Fayetteville, N.Y.; Peter L. Podolak, Westminster, Md.

[73] Assignee: Syracuse University, Syracuse, N.Y.

[21] Appl. No.: 790,880

[22] Filed: Oct. 24, 1985

Related U.S. Application Data

[63] Continuation-in-part of Ser. No. 628,904, Jul. 9, 1984, Pat. No. 4,563,281.

[51] Int. Cl.⁴ .............................................. C02F 3/28
[52] U.S. Cl. .................................. 210/96.1; 210/150; 210/258
[58] Field of Search ............... 210/614, 619, 603, 741, 210/96.1, 150, 151, 218, 219, 319, 143, 258

[56] References Cited

U.S. PATENT DOCUMENTS

| | | | |
|---|---|---|---|
| 3,869,380 | 3/1975 | Torpey | 210/619 X |
| 3,871,999 | 3/1975 | Torpey | 210/619 X |
| 4,211,647 | 7/1980 | Friedman | 210/619 X |

Primary Examiner—Tom Wyse
Attorney, Agent, or Firm—Bruns and Wall

[57] ABSTRACT

In the treatment of high strength wastewater containing anaerobically digestible nutrients and organic substrates, the water is passed through a sealed reactor housing and the pressure in the headspace over the water is reduced under controlled conditions to provide for optimum operating conditions.

14 Claims, 6 Drawing Figures

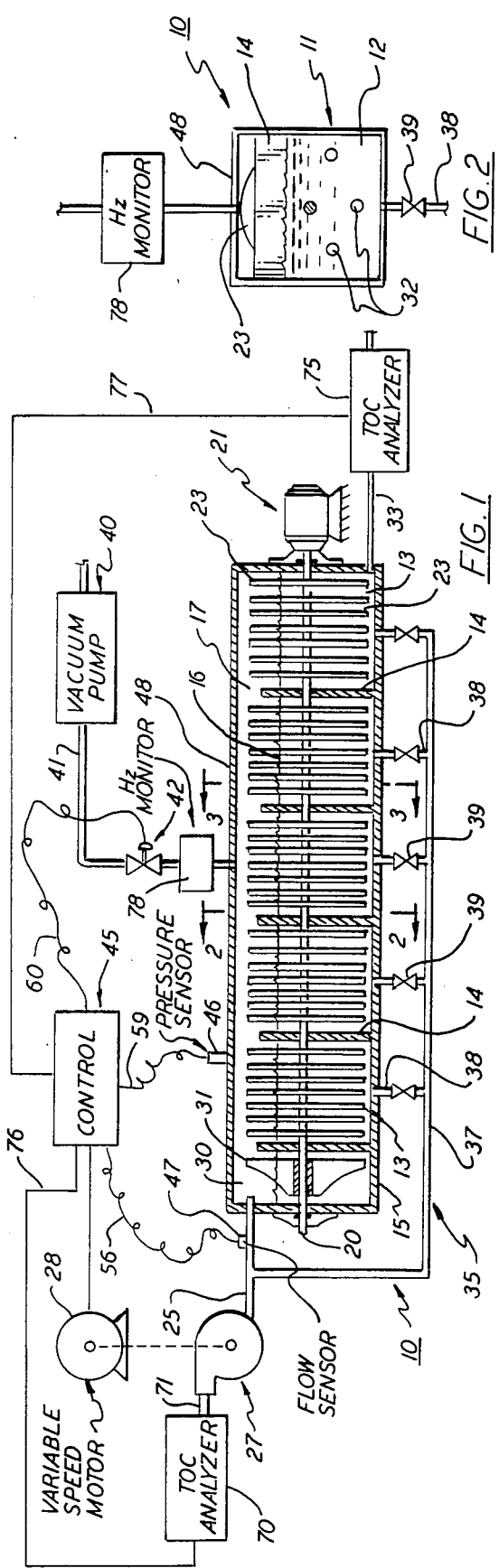
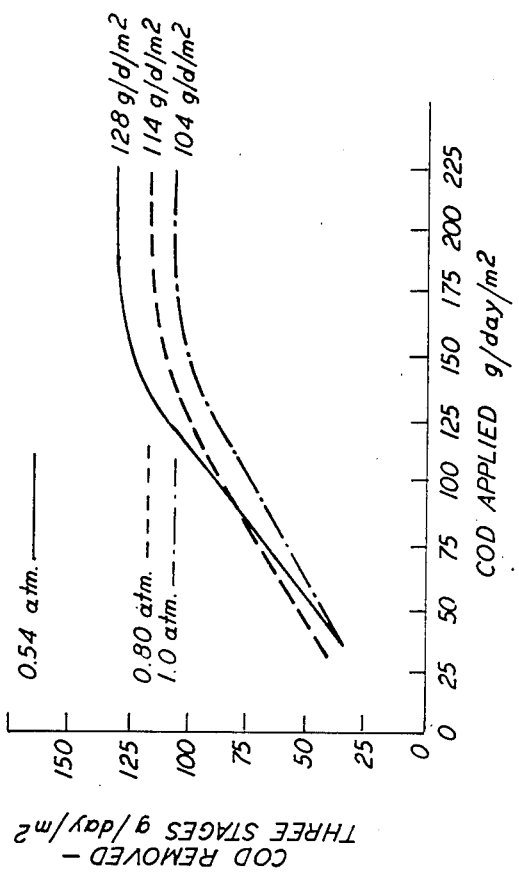
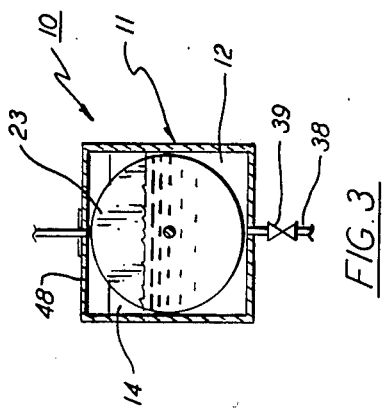

FRACTIONAL COD REMOVAL AS A FUNCTION OF
HEADSPACE PRESSURE - LINEAR LOADING RANGE

MAXIMUM COD REMOVAL - NON LINEAR

ANAEROBIC CONTACTOR

BACKGROUND OF THE INVENTION

This application is a continuation-in-part of co-pending application Ser. No. 628,904, filed July 9, 1984, in the name of the present inventors, and now U.S. Pat. No. 4,563,281.

This invention relates to an improved wastewater treatment system and, in particular, to the control of an anaerobic system for treating high strength wastewater.

As evidenced in U.S. Pat. Nos.:
3,640,846, 3,724,542, 3,817,857, 3,994,780, 4,043,936, 4,067,801, 4,100,023, 4,134,830 many different types of anaerobic systems have been devised for treating wastewater containing various biodegradable substrates and nutrients. All these systems operate under ambient or atmospheric conditions and are for the most part rate limited in terms of the amount of influent that can be efficiently passed through the system. The physical transport of gaseous end products through a biofilm can significantly influence the anaerobic decomposition of organic waste. Anaerobic biofilms are extremely porous materials and the rapid generation of micro-bubbles therein, usually of hydrogen, carbon dioxide and/or methane, can block the transport of nutrients and substrate to the organic cell sites. Transport of exoenzymes and other metabolic end products are also constrained by the microbubbles. An increase in the concentration of these materials beyond a certain level further results in product inhibition and/or the accumulation of toxic materials at the cell sites.

Molecular hydrogen ($H_2$) is a key intermediate in controlling complex interspecies reactions occurring during the anaerobic degradation of waste in a fluid medium. Molecular hydrogen is released by one group of microorganisms into solution and used by methanogens to reduce carbon dioxide to methane the desirable end product of anaerobic waste treatment. Too high a partial pressure of $H_2$ in solution reduces or inhibits the conversion of substrate to methane. By the same token, too little $H_2$ results in thermodynamically unfavorable conditions for the production of methane. Therefore, when operating under atmospheric conditions, the partial pressure of $H_2$ must be maintained within a very narrow range to efficiently produce methane.

Sulfides are also produced in solution from sulfates and sulfur containing compounds that are also present in the wastewater. This, in turn, raises the toxic levels of sulfides in the biofilm to a point where the effectiveness of the anaerobic bacterial system is adversely affected.

As will be explained in greater detail below, many of the criticl parameters that adversely affect the complex metabolic interactions of various species involved in anaerobic processes can be controlled or reduced by controlling the headspace pressure over the wastewater as it is being treated. By operating the system at subatmospheric conditions, gas pressures in and about the biofilms can also be relieved by reducing their solubility in the wastewater. An earlier U.S. Pat. No. 4,211,647 to Friedman et al describes an evacuated contactor reactor for carrying out an anaerobic treatment of wastewater, however, means to control the process are not described.

SUMMARY OF THE INVENTION

It is therefore an object of the present invention to improve anaerobic reactors for treating high strength wastewater.

It is a further object of the present invention to provide an improved subatmospheric reactor for enhancing biofilm performance in an anaerobic wastewater treatment system.

A still further object of the present invention is to control the operation of a subatmospheric anaerobic reactor to optimize the removal rate of the system over a wide range of influent flows.

Another object of the present invention is to reduce the gas solubility in an anaerobic reactor to encourage the rapid and efficient removal of inhibiting and toxic gases from the solution to permit continuous operation of a heavily loaded system.

Yet another object of the present invention is to reduce the operating pressure of an anaerobic reactor to facilitate the removal of microbubbles trapped in the biofilm which interfere with the release of exoenzymes and thus block the removal of metabolic wastes or that otherwise inhibit desirable microorganism metabolism.

A further object of the present invention is to provide control equipment for an anaerobic reactor that will hold the hydrogen content in the headspace of the reactor at optimum conditions.

These and other objects of the present invention are attained by means of an anaerobic reactor that includes a gas tight housing having a shaft passing therethrough upon which is affixed a series of contactors that are sequentially passed through wastewater contained in the housing and the headspace over the wastewater. Anaerobic organisms form a biofilm on the contactor which feed upon anaerobically digestible nutrients and organic substrates. A vacuum pump and an influent pump are controlled by a microprocessor to vary the headspace pressure in response to the state of the influent to maintain the reactor at optimum operating conditions over a wide loading range.

BRIEF DESCRIPTION OF DRAWINGS

For a better understanding of these and other objects of the present invention, reference is had to the following detailed description of the invention which is to be read in conjunction with the accompanying drawings, wherein:

FIG. 1 is a side elevation in section showing a reactor embodying the teachings of the present invention;

FIG. 2 is a section taken along lines 2—2 in FIG. 1;

FIG. 3 is a section taken along lines 3—3 in FIG. 1;

FIG. 4 is a graphic representation showing the response of the present reactor in terms of COD areal removal at different headspace pressures.

DESCRIPTION OF THE INVENTION

Figure 5:
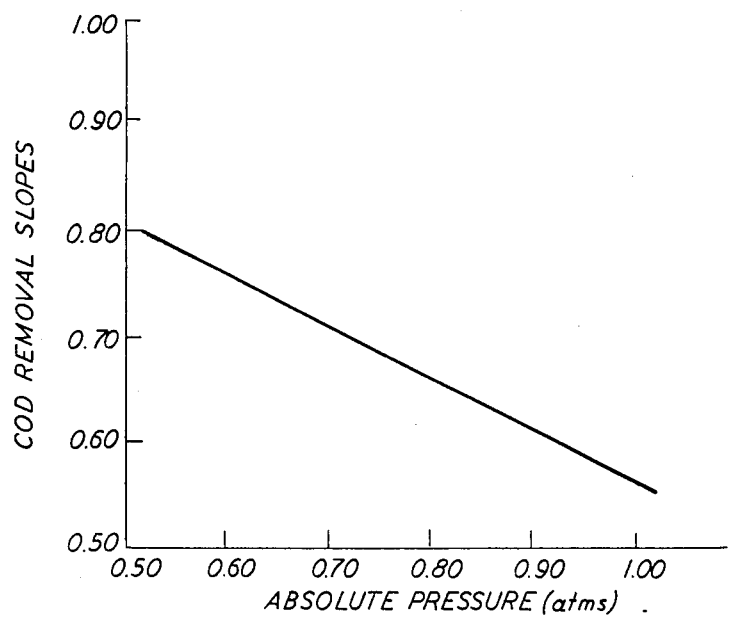
FIG. 5 is also a graphic representation showing the slopes of the linear portions of the curves shown in FIG. 4.

Referring initially to FIGS. 1-3 there is shown an anaerobic reactor, generally referenced 10, for treating high strength wastewater containing anaerobically digestible nutrients and organic substrates. The reactor system includes a gas and liquid tight housing 11 that is capable of containing a quantity of wastewater 12 therein that might include biodigestible materials such as carbohydrates, fats, proteins, alcohols, acids and the like that are either soluble or insoluble in the wastewater and which can exist alone or in combination with other substrates and nutrients. The housing is partitioned into a number of individual compartments or stages 13—13 of equal volume by means of partitions 14—14. However, in some applications it may be desirable to use stages of unequal size.

The partitions 14—14 extend upwardly from the floor 15 of the reactor housing to an elevation that is slightly above the normal level 16 of the wastewater maintained therein. This provides for a continuous relatively uninterrupted headspace 17 over the wastewater whereby the pressure over each stage remains the same during anaerobic activities. As will be explained in greater detail below, the headspace gas pressure is reduced under controlled conditions to a predetermined subatmospheric value during anaerobic treatment of the wastewater to increase both the volumetric and areal COD removal rates to provide for more efficient wastewater treatment. The term COD as herein used refers to the chemical oxygen demand of the nutrients and substrates and is well known in the art as a measure of the wastewater strength in terms of milligrams per liter.

A horizontally disposed shaft 20 is mounted in the housing upon suitable watertight bearings and is operatively coupled to a variable speed drive motor 21. Secured to the shaft at spaced intervals within the housing are a plurality of contactors 23—23. Each contactor is a surface, in this case discs, that are affixed to the shaft for rotation therewith. The discs are positioned so that an equal number are contained within each reactor stage with about between 50%-80% of the surface of each disc being immersed in the wastewater. In practice, colonies of anaerobic microorganisms form a biomass upon the rotating surfaces which are capable of feeding upon digestible nutrients and substrates found in the wastewater. The partially immersed surface draws the biomass sequentially through the wastewater and the headspace so that nutrients and substrates are removed from the wastewater for a portion of each revolution of the shaft and process gases are readily expelled into the headspace for the remaining portion thereof. This establishes a controlled feeding cycle within the system which overcomes many of the problems associated with systems in which the biomass is completely flooded.

Influent is brought into the reactor housing via an inlet pipe 25 connected to the discharge side of an influent pump 27. The pump is driven by a variable speed motor 28 whereby the rate of entry of influent wastewater into the housing can be closely regulated. Initially the influent may pass through a mixing chamber 30 that may contain an impeller 31 secured to shaft 20 which serves to premix the influent and keeps the wastewater contained in the housing agitated. Alternatively, influent may be added directly to the first as well as subsequent stages. The wastewater passes between stages via holes 32—32 (FIG. 2) formed in the partitions separating the stages and is finally passed out of the housing via discharge line 33. As can be seen, each treatment stage is segregated by the partitions so that concentration of nutrients and substrates in the wastewater is lowered in stages as the wastewater moves laterally through the housing. Progressive lowering of the concentration gradient promotes good waste removal while at the same time minimizes reactor space. To extend the operational capacity of the reactor, an auxillary influent delivery system, generally referenced 35, is furnished which is able to introduce raw influent into one or more selected stages. A bypass line 37 diverts a portion of the influent leaving the influent pump below the housing beneath each of the stages. The line is connected into each stage by a supply line 38 that passes through the floor of the housing and a remotely controlled valve 39. The valves are capable of being selectively adjusted to regulate the amount of raw influent that is introduced into each treatment stage.

A vacuum pump 40 is connected to headspace of the reactor via vacuum line 41 and a remotely actuated vacuum control valve 42 that is operable to regulate headspace pressure within the reactor housing. A controller 45, which can be a suitable microprocessor, is programmed to regulate the activity of both the influent pump motor and the vacuum control valve 42 in response to data provided by a pressure sensor 46 via line 59 and a flow sensor 47 via line 56. The pressure sensor is situated in the roof 48 of the reactor housing and is arranged to measure the headspace pressure maintained in the housing. The influent flow sensor is mounted in influent line 25 and is arranged to measure the rate of flow of the entering wastewater. A total carbon analyzer unit 70 is operatively connected into the main influent supply line 71 which delivers raw wastewater to the inlet of pump 27. As will become clear from the disclosure below, the analyzer can be similarly connected into line 25 or any other convenient point where influent is flowing into the reactor. The analyzer is capable of continually sampling the influent and in response thereto providing an electrical output signal indicative of the total organic carbon (TOC) concentration in the influent. As is well known in the art, the total organic carbon concentration is related directly to the chemical oxygen demand (COD) of the influent whereby the TOC sample readings can be quickly converted to COD measurements.

A second total carbon analyzer unit 75 can be operatively connected into the effluent line 33 which operates in a similar manner to sample effluent and measures its TOC concentration. As can be seen, this permits the COD of both the influent and the effluent to be determined. By comparing the two and using the metered flow rate fed to the reactor, the mass flow rate can be instantaneously determined. An analyzer unit suitable for use in association with the reactor is commercially available through Xerter-Dohrman Process Instrument Co. of Santa Clara, Calif. and is marketed under either model number DC-80 or COA-2000.

The sample data from both analyzer units is supplied to the controller via data lines 76 and 77 which processes the data and provides control signals to both the pump motor and the vacuum control valve.

It is also important to the operation of the present reactor to know the hydrogen concentration in the headspace 17 over the wastewater being treated in the reactor housing. If the reactor becomes overloaded with hydrogen, the microbiological process will become inhibited and the work performed by the microorganisms will correspondingly slow down or cease entirely. On the other hand, if the hydrogen concentration in the headspace becomes too low, there will be insufficient hydrogen available for converting the organic materials to methane and again the efficiency of the reactor will fall off. It is therefore important to maintain the hydrogen concentration in the reactor within a range to obtain optimum process efficiency. This range is dependent on many factors such as the nature of the influent flow rates through the reactor, contactor surface area and the like.

A hydrogen monitor unit 78 is connected into the vacuum line 41 between the reactor housing and the vacuum control valve 42. The monitor unit is adapted to sample the gas leaving the reactor and provide a signal indicative of the hydrogen concentration in the gas to the controller 45. In the event the concentration is outside the desired operating range, the controller will either open or close the control valve 42 to regulate the flow of gas out of the reactor to bring the concentration back to a desired level for optimum operation and/or vary the flow rate of the influent into the reactor to bring the hydrogen concentration into the desired optimum range. The hydrogen monitor can be used alone or in conjunction with the TOC analyzer to control the reactor. If the hydrogen concentration is above an acceptable level, the controller will reposition the vacuum control valve to increase the vacuum pressure in the housing and/or reduce the rate of wastewater flow through the housing to bring the hydrogen level back into desired limits. In the event the hydrogen concentration in the headspace is below desired limits, the controller will similarly reposition the vacuum control valve to reduce the headspace vacuum pressure and/or increase the wastewater flow through the system.

It should be noted that by monitoring both the loading over the reactor and the hydrogen concentration in the reactor, a very close control can be maintained over the system to provide optimum efficiency under varying conditions.

This invention will now be described in greater detail with reference to an example wherein a reactor of the type described has an internal volume of 6.5 liters. The reactor is approximately 60 cms long and was divided into four stages of equal volume using fixed partitions each of which contained eight 1.88 cm holes to allow solids, gases and liquids to pass between stages. Each stage contains ten 12.70 cm diameter contactors 0.318 cm thick spaced at 1.27 cm intervals. The discs furnish a nominal surface area for biomass attachment of about 1.14 m and the shaft is turned at 17 rpm.

The reactor is operated with approximately 40 to 80 percent of the disc area submerged in wastewater. Headspace pressure is monitored by pressure sensor 46 and wastewater flow through the reactor regulated by controlling the speed of the pump. The reactor, during operation, is kept at a temperature of between 15° and 60° C. depending on whether mesophyllic or thermophyllic microorganisms are employed. Offgases are vented by vacuum pump 40 and line 41 and measured using a water displacement technique. The substrate consists of sucrose as the sole carbon source and sodium bicarbonate and other inorganic nutrients are added to the influent to provide an influent of known constant strength. The TOC of both the influent and effluent is determined by the two analyzer units 70 and 75 to determine the COD of both the influent and the effluent.

A reactor similar to that described above was operated under different mass loading conditions and pressure combinations. The headspace pressures for these conditions are listed below:

| EXPERIMENTAL CONDITIONS | | Gas Phase Absolute Pressure (Atmospheres) | | |
|---|---|---|---|---|
| | | 1.0 | 0.80 | 0.54 |
| [3000 mg/l] | Mass COD Applied (gm/day) | 48.63 | 47.04 | 48.65 |
| | Observed VSS Growth Yield | 0.165 | 0.212 | 0.329 |
| | Surface Area Used ($m^2$) | 0.855 | 0.855 | 0.855 |
| | Methane Yield (liters/g COD Removed) | 0.287 | 0.224 | 0.213 |
| | Areal Removal Rate (Kg COD/$m^2$-day) | 0.04965 | 0.05208 | 0.05253 |
| | Volumetric Removal Rate (Kg COD/$m^3$-day) | 6.324 | 6.634 | 6.691 |
| | Percent Removal | 87.3 | 94.7 | 92.9 |
| [5000 mg/l] | Mass COD Applied (gm/day) | 70.00 | 89.24 | 92.50 |
| | Observed VSS Growth Yield | 0.159 | 0.253 | 0.200 |
| | Surface Area Used ($m^2$) | 1.140 | 0.855 | 0.855 |
| | Methane Yield (liters/g COD Removed) | 0.364 | 0.347 | 0.203 |
| | Areal Removal Rate (Kg COD/$m^2$-day) | 0.05226 | 0.08650 | 0.09156 |
| | Volumetric Removal Rate (Kg COD/$m^3$-day) | 6.657 | 11.018 | 11.662 |
| | Percent Removal | 85.1 | 82.9 | 84.6 |
| [8000 mg/l] | Mass COD Applied (gm/day) | 173.9 | 173.7 | 173.6 |
| | Observed VSS Growth Yield | 0.227 | 0.289 | 0.309 |
| | Surface Area Used ($m^2$) | 0.855 | 0.855 | 0.855 |
| | Methane Yield (liters/g COD Removed) | 0.238 | 0.262 | 0.367 |
| | Areal Removal Rate (Kg COD/$m^2$-day) | 0.1038 | 0.1074 | 0.1137 |
| | Volumetric Removal Rate (Kg COD/$m^3$-day) | 13.217 | 13.676 | 17.028 |
| | Percent Removal | 51.0 | 52.8 | 65.6 |

NOTE:
Areas and volumes are based on actual reactor capacity used to achieve removal values shown.

As can be seen, higher yields were observed for all reduced headspace gas pressures which is desirable at system startup and during recovery from extended toxic shocks. Not only was improved COD removal under vacuum operation observed but also an increase in COD utilization in each of the stages, particularly the first two stages, where the bulk of COD removal takes place. A linear relationship between headspace pressure and mass COD removal was observed. Under a reduced pressure of 0.54 atmospheres the first stage removal rate was about doubled for the loading at 3000 and 5000 mg of COD per liter of influent. For 8000 mg COD/liter influent, the removal rate increased by 77 percent. Typically, about 62% of the total COD removal took place in the first two stages and linear relationship between pressure and removal rate indicates that both the mass and areal removal rates are significantly increased as a function of both increased loading and reduced headspace pressure.

Under atmospheric conditions, higher concentrations of propionic and butyric acids were observed in each stage of the reactor than observed at lower pressures. High concentrations of these acids reflect bacterial attempts to regulate redox potential, reduce acid equivalents and remove toxic accumulations of molecular hydrogen under stressed conditions. Vacuum operations helped to alleviate metabolic inefficiencies indicated by the presence of the propionic and butyric acids. As a result, greater COD removal and minimization of pH problems associated with start-up and shock organic loads on anaerobic systems can be obtained at reduced operating pressures. Furthermore, higher pH values at reduced pressures indicate that organic loadings of the anaerobic system can be increased under vacuum operation without the toxic effects related to low pH values.

The COD removal was observed to be largely completed in the first three stages of the reactor. The removal through the first three stages was analyzed in terms of areal removal rates in both a linear loading range and a non-linear loading range. Referring now to FIG. 4, the COD removal in terms of grams per square meter of contactor surface per day ($g/m^2/day$) is plotted against the COD applied to the reactor. The curves show that the areal removal rates change linearly over the 50–125 $g/m^2/day$ COD range for varying headspace pressures with the lines becoming asymptotic to a limiting COD removal rate for each observed pressures.

The slopes (COD removed/COD applied) of the linear portions of the curves shown in FIG. 4 are plotted as a function of headspace pressure in FIG. 5. The data clearly shows that areal removal rates increase substantially as headspace pressure is reduced. The linear portion of the curves can be described by the relationship:

$$M_R = M_A C(1.06 - 0.497P) - k(20.59P - 2.63) \quad (1)$$

where:
 $M_R$ is the mass COD removed in $g/m^2/day$,
 $M_A$ is the mass COD applied to the reactor in $g/m^2/day$,
 C and k are constants relating to the source characteristics of the influent, and
 P is the headspace absolute pressure in atmospheres.

The constants C and k are determined experimentally from empirical data for each classification of wastewater where the value of the constant is about 1.0 for easily degradable wastewater such as sugar and less than 1.0 for more complex wastewaters.

Figure 6:
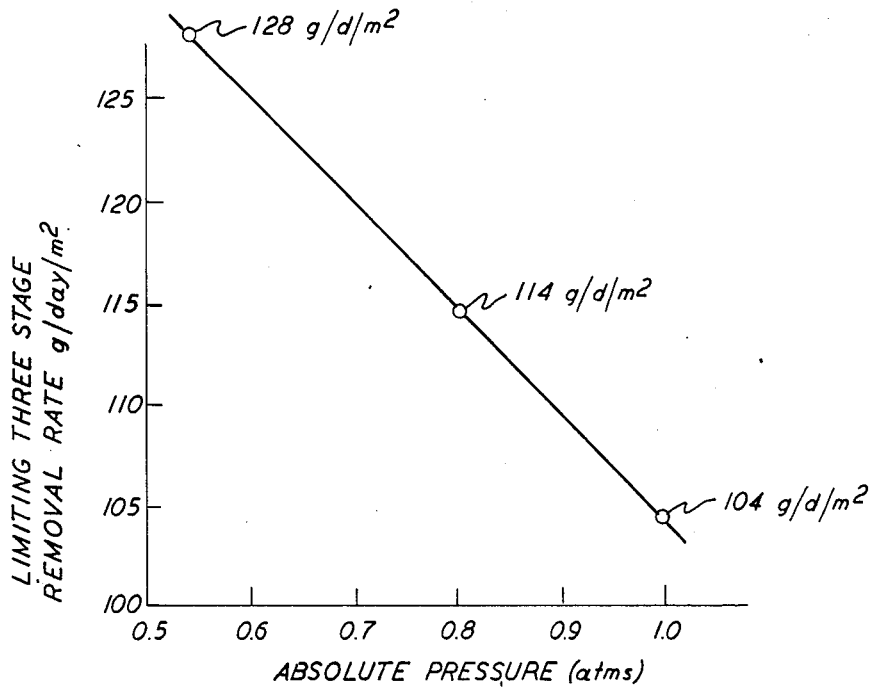
FIG. 6 is a graphic representation showing maximum COD removal rates as a function of attainable headspace pressure.

When the limiting COD areal removal rates indicated in FIG. 4 are plotted against headspace pressure as shown in FIG. 6, a linear relationship is evident. Here again the data clearly shows the limiting COD removal rate also varies linearly with pressure over a wide loading range. The maximum or limiting COD over this range is described by the relationship:

$$M_R = C(155.8 - 51.6P) \quad (2)$$

where the terms are again as described above.

From the observed data it is evident that subatmospheric headspace operation of the reactor improved both areal and volumetric COD mass removal rates. These improvements are found to be related linearly to the applied vacuum and thus easily adaptable for use in a computerized control system of the type herein described. As can be seen, the controller can be programmed to regulate both the loading on the reactor and the vacuum maintained in the reactor housing to continually hold the system at optimum operating conditions. In this particular application it is assumed that the make-up of the wastewater influent is relatively constant and known. The rate of flow of the influent along with the influent TOC measurements provide a clear indication of the loading placed on the system. The flow sensor 47 is adapted to send flow data to the controller 45 by data line 56. Similarly, the pressure within the housing is also monitored by vacuum sensor 46 and this data is also provided to the controller via data line 59. As can be seen by knowing the mass rate of flow and mass loading rate being delivered to the system, the pressure within the housing can be set using vacuum control valve 42 to maintain the system at a desired operating point for optimum efficiency. Control signals are sent from the controller to the valve by means of control line 60.

As can be seen, reduced pressure operation of the anaerobic reactor results in a substantial improvement in COD removal for high loading conditions. Furthermore, both the linear and limiting COD removal rates vary linearly over a relatively wide operating range so that optimum operating conditions can be accurately predicted and the reactor easily controlled for maximum efficiency as herein described. For operational systems that are presently overloaded because of shock loading, pH, $H_2$, $H_2S$ and end product toxicity, an existing reactor can also be easily retrofitted for subatmospheric operation to thus alleviate the problems. In addition, vacuum operation will result in rapid biomass growth during start-up and accelerated recovery from extended toxic conditions.

While this invention has been described with specific reference to the above noted method, it should be clear to one skilled in the art that the invention is not limited by this disclosure.

We claim:

1. Apparatus for treating wastewater containing anaerobically digestible nutrients and organic substrates that includes
 a gas tight reactor housing for containing a quantity of wastewater, said housing having a shaft rotatably mounted therein,
 means to turn the shaft at a desired rate,
 a plurality of spaced apart contactors affixed to the shaft for supporting a biofilm of anaerobic organisms, said contactors being partially immersed in the wastewater whereby the biofile is passed in series through the wastewater and a headspace over the wastewater,
 wastewater flow circuit for passing wastewater through the reactor housing,
 automatic detector means positioned in the wastewater flow circuit for determining the chemical oxygen demand loading on the reactor and providing an output signal and indicative of the loading, and
 control means responsive to the output signal of the detector means for regulating the pressure in the headspace to maintain the reactor at a predetermined operating level.

2. The apparatus of claim 1 wherein the operating level of the reactor is regulated for fractional chemical oxygen demand (COD) removal rates according to the relationship:

$$M_R = M_A C(1.084 - 0.48P) + k(16.24P - 6.44)$$

where:
 $M_R$ is the mass COD removed in $g/m^2/day$,
 $M_A$ is the mass COD applied in $g/m^2/day$,
 C and k are both constants relating to the source characteristics of the influent, and
 P is the headspace absolute pressure in atmospheres.

3. The apparatus of claim 1 wherein the operating level of the reactor is regulated for maximum COD removal according to the relationship:

$$M_R = M_A C(155.8 - 51.6P)$$

where:
- $M_R$ is the mass COD removed in g/m²/day,
- $M_A$ is the mass COD applied in g/m²/day,
- C is a constant relating to the source characteristic of the influent, and
- P is the headspace absolute pressure in atmospheres.

4. The apparatus of claim 1 wherein the wastewater flow circuit further includes a variable speed influent pump for regulating the rate of influent entering the reactor housing.

5. The apparatus of claim 1 that further includes a mixing means for agitating the wastewater contained in said reactor.

6. The apparatus of claim 1 wherein said reactor housing contains a number of partitions for dividing the housing into a series of treatment stages.

7. The apparatus of claim 6 wherein each partition extends upwardly from the floor of the reactor housing to an elevation between the level of the wastewater and the ceiling of the reactor housing whereby each stage is subjected to the same headspace pressure.

8. The apparatus of claim 1 wherein the automatic detector means includes a first unit for determining the chemical oxygen demand (COD) of the influent entering the reactor housing and a second unit for determining the chemical oxygen demand of the effluent leaving the reactor housing.

9. The apparatus of claim 8 wherein the control means further includes an electrically operated control valve connected into the headspace over the wastewater and a hydrogen monitor for determining the hydrogen concentration in the reactor headspace whereby the valve is adjusted to hold the pressure in the headspace within a desired operating range.

10. Apparatus for treating wastewater containing anaerobically digestible nutrients and organic substrates that includes
- a gas tight reactor housing containing a quantity of wastewater and having a shaft rotatably mounted in said housing,
- means to drive the shaft at a predetermined rate,
- a plurality of contactors spaced apart along said shaft for rotation therewith, each contractor supporting a biofilm of anaerobic organisms and is partially immersed in said wastewater so that the biofilm is passed sequentially through the wastewater and a headspace over the wastewater,
- means for passing wastewater through said reactor housing at a desired rate,
- a control valve operatively connected into the headspace over the wastewater for controlling the flow of head space gas out of the reactor,
- a monitoring unit arranged to sense the concentration of hydrogen in the headspace gas and provide a data signal indicative thereof, and
- control means operatively connected between the monitoring unit and the control valve for positioning said control valve in response to the concentration of hydrogen sensed in the headspace gas whereby the concentration of hydrogen in the reactor is held within desired limits.

11. The apparatus of claim 10 wherein means for passing wastewater through the reactor housing is a variable speed pump.

12. The apparatus of claim 11 wherein the control means is further connected to the pump to regulate the speed of the pump in response to the concentration of hydrogen in the reactor housing.

13. The apparatus of claim 11 further including a sensing means for detecting the rate of flow of wastewater through the reactor housing.

14. The apparatus of claim 10 that further includes means to agitate the wastewater in the reactor housing.

* * * * *

UNITED STATES PATENT AND TRADEMARK OFFICE
CERTIFICATE OF CORRECTION

PATENT NO. : 4,690,755

DATED : September 1, 1987

INVENTOR(S) : Alexander A. Friedman et al.

It is certified that error appears in the above-identified patent and that said Letters Patent is hereby corrected as shown below:

Column 8, line 43, change "biofile" to "biofilm".

Column 8, line 51, after "an output signal" delete "and".

Column 10, line 9, "contractor" should be "contactor".

Signed and Sealed this

Twelfth Day of January, 1988

Attest:

DONALD J. QUIGG

Attesting Officer

Commissioner of Patents and Trademarks